US007281251B2

(12) United States Patent
Otsuka et al.

(10) Patent No.: US 7,281,251 B2
(45) Date of Patent: Oct. 9, 2007

(54) DEVICE STATUS MONITORING SYSTEM, DEVICE STATUS MONITORING METHOD, AND A DATA STORAGE MEDIUM AND OBJECT PROGRAM THEREFOR

(75) Inventors: Junichi Otsuka, Ueda (JP); Masaki Hyogo, Ueda (JP); Masahiro Katagiri, Misato-mura (JP)

(73) Assignee: Seiko Epson Corporation, Tokyo (JP)

( * ) Notice: Subject to any disclaimer, the term of this patent is extended or adjusted under 35 U.S.C. 154(b) by 568 days.

(21) Appl. No.: 10/045,578

(22) Filed: Jan. 11, 2002

(65) Prior Publication Data

US 2002/0095495 A1 Jul. 18, 2002

(30) Foreign Application Priority Data

Jan. 16, 2001 (JP) ............................ 2001-007913

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/313; 719/328

(58) Field of Classification Search ........ 719/310-316, 719/318, 321-327, 328-330; 709/223-224; 712/1, 3, 13, 28-36

See application file for complete search history.

(56) References Cited

U.S. PATENT DOCUMENTS 5,504,863 A * 4/1996 Yoshida ....................... 714/47
5,712,629 A * 1/1998 Curtiss et al. ................ 710/5

(Continued)

FOREIGN PATENT DOCUMENTS

JP 03-071234 3/1991

(Continued)

OTHER PUBLICATIONS

Epson et al, OLE for Retail POS—Application Programmer's Guide, Mar. 6, 1998, pp. 1-31.*

(Continued)

*Primary Examiner*—William Thomson
*Assistant Examiner*—Diem Cao
(74) *Attorney, Agent, or Firm*—Hogan & Hartson LLP

(57) ABSTRACT

A device status monitoring system and method for a POS (point of sale) terminal system, in which an OPOS (OLE for Retail POS) object continuously records changes in device status to a file. A control system (OPOS object) includes a first object (control object) providing an interface for a device class to an application program, and a second object (service object) providing an interface for a specific device to the first object. The second object has commands for executing a process for: receiving status data indicating a device status from the specific device; detecting, as status change data, status data that changed by comparing the received status data with previously received status data; determining, based on predefined recording conditions, whether the status change data is data to be recorded in a log file; generating log data for recording the status change by converting the status change data to a text message and adding time information to the text message; and storing the log data to a log file specified by the recording conditions.

18 Claims, 9 Drawing Sheets

U.S. PATENT DOCUMENTS

| | | | | |
|---|---|---|---|---|
| 5,787,019 | A * | 7/1998 | Knight et al. | 719/324 |
| 5,911,527 | A * | 6/1999 | Aruga et al. | 400/149 |
| 5,960,214 | A * | 9/1999 | Sharpe et al. | 710/15 |
| 6,741,558 | B1 * | 5/2004 | Gresham | 370/230 |
| 6,785,015 | B1 * | 8/2004 | Smith et al. | 358/1.15 |
| 6,823,519 | B1 * | 11/2004 | Baird et al. | 719/313 |
| 2001/0029534 | A1 * | 10/2001 | Spinks et al. | 709/224 |

FOREIGN PATENT DOCUMENTS

| | | |
|---|---|---|
| JP | 03-105503 | 5/1991 |
| JP | 06-168187 | 6/1994 |

OTHER PUBLICATIONS

Hatch, OPOS Pole Display, IEE Inc, Oct. 1998, pp. 1-2.*

IEE Inc, OPOS Application Notes, Aug. 3, 1999, pp. 1-3.*

* cited by examiner

DEVICE STATUS MONITORING SYSTEM, DEVICE STATUS MONITORING METHOD, AND A DATA STORAGE MEDIUM AND OBJECT PROGRAM THEREFOR

BACKGROUND OF THE INVENTION

1. Field of the Invention

The present invention relates generally to a device status monitoring system, a device status monitoring method, and a data storage medium and object program recording the same. More particularly, the invention relates to a device status monitoring system and method that use an OPOS service object to continuously record status change data indicating a change in the status of a device in a POS terminal system to a status change recording unit based on specified recording conditions, and a data storage medium and object program recording the same.

2. Description of Related Art

Multifunction POS (point-of-sale) systems can be assembled without specifically considering the makes and models of devices used to configure the POS system by using a standard application programming interface (API) to develop a software application providing POS system functions. OPOS (OLE for Retail POS) is an international standard defining a standardized interface for handling devices (such as printers and displays) used in the POS terminals (referred to below as POS terminal systems) of a POS system. An OPOS standard object uses OLE (Object Linking and Embedding) controls, which are supported by the Windows (a registered trademark of Microsoft Corp.) operating system (OS) running on the host devices of the POS system, to provide application developers with a set of API functions that make application development easier. Note that OPOS standard objects are referred to below as simply "OPOS."

Information needed to use OPOS, that is, information about all of the devices in the POS terminal system and settings for all of the devices (referred to below as the OPOS device environment configuration), is stored in a database (referred to below as the registry) of system configuration information managed by the Windows OS. This registry is a database for centrally managing all settings related to computer operation, including all device driver settings and application settings. Information about each device in the POS terminal system, including a device identifier and various settings for each device, stored in the registry as part of the OPOS device environment configuration settings is referred to below as the device information or the device profile. In other words, the OPOS device environment configuration settings include a device profile for each device in the system configuration.

Data indicating a change in the status of a device (referred to below as "status change data") that is reported to the application providing POS terminal system functions through OPOS is conventionally only part of the status change data detected from status data received from a particular peripheral device by the host computer running the application. More specifically, OPOS determines which of the device status change data must be reported to the application, and sends only the necessary status changes to the application. The problem with this is that the application is therefore unable to know all of the device status changes, which makes it difficult to troubleshoot errors and problems in the system or a particular device.

Devices can also use LEDs or other type of display to inform the POS terminal system user or developer, for example, that an error has occurred and even indicate the type of error. In a POS terminal system in which the device and host computer are integrated into a single unit, however, the device status (error) indicator is hidden inside the POS terminal system, and the POS terminal system user or developer cannot easily know what the problem reported by the device is. The device installation (where and how the device is installed) may also make the status display unreadable. The status display may even be eliminated in order to reduce device cost. Because problems with a device cannot be known in real time in these cases, errors cannot be addressed. This means the source of the problem cannot be determined, and it takes longer to resolve problems and restore the device to normal working condition.

SUMMARY OF THE INVENTION

This invention is therefore directed to a solution for these problems, and an object of this invention is to provide a device status monitoring system and monitoring method using an OPOS service object to continuously record status change data indicating a change in the status of a device in a POS terminal system to a status change recording unit based on specified recording conditions.

We have researched solutions for the prior art problems described above. As a result we discovered that all changes in device status can be recorded by providing, in an OPOS service object for controlling a device connected to a host computer through the operating system of the host computer in a POS terminal system, a function for recording status change data, which is indicative of a change in device status, to a file or other data recording unit.

The invention we derived from this research is described briefly below.

A device status monitoring system according to the present invention has a status change data recording unit for sequentially recording, by means of a second object of a device control system, status change data indicating a change in a particular device status to a status change recording unit, also referred to below as a log file. The device control system is a system for controlling a specific device connected to the host computer of a POS terminal system through the operating system of the host computer. The device control system has a first object providing a device class interface to an application run under the operating system and capable of controlling the device. The second object of the device control system provides an interface for a specific device to the first object.

The status change data recording unit preferably has a receiving unit for receiving status data from the specific device, and a status change data detection unit for detecting status data that changed to obtain the status change data based on the status data received by the receiving unit and the previously received status data.

Further preferably, the status change data recording unit has a recorded data editor for editing the status change data to generate the status change recording data (also referred to below as log data), which is recorded to the log file.

The recorded data editor preferably has a recorded data evaluation unit for determining, based on predefined recording conditions, if the status change data detected by the status change data detection unit is data to be recorded in the status change data log file.

The status change data includes error status and/or off-line status data, and the recording conditions include information indicating if the error status and/or off-line status data should be recorded. In addition to the type of status change data to be recorded, the recording conditions can also specify the devices for which status change data is to be recorded, the name of the log file to which the status change data is recorded, and the maximum size of the log file.

Preferably, the recorded data editor has a recorded data generating unit for converting the status change data detected by the status change data detection unit to a text message and adding time information to the text message to generate the log data.

In another aspect, the present invention provides a device status monitoring method having the same operation and effect as the monitoring system. In yet another aspect, the present invention provides a computer-executable program that implements the device status monitoring method. The program can be recorded to and distributed using a data storage medium such as a Compact Disc (CD), floppy disk, hard disk, magneto-optical disc, Digital Versatile/Video Disc (DVD), magnetic tape, or semiconductor memory, or transmitted by a carrier wave over a communication channel.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures. It will be noted that the following embodiments are shown by way of description only and shall not limit the scope of the invention. It will be obvious to one of ordinary skill in the related art that various alternative embodiments can be achieved by replacing some or all of the elements described below with equivalent elements, and that all such variations are included in the scope of this invention.

Figure 1:
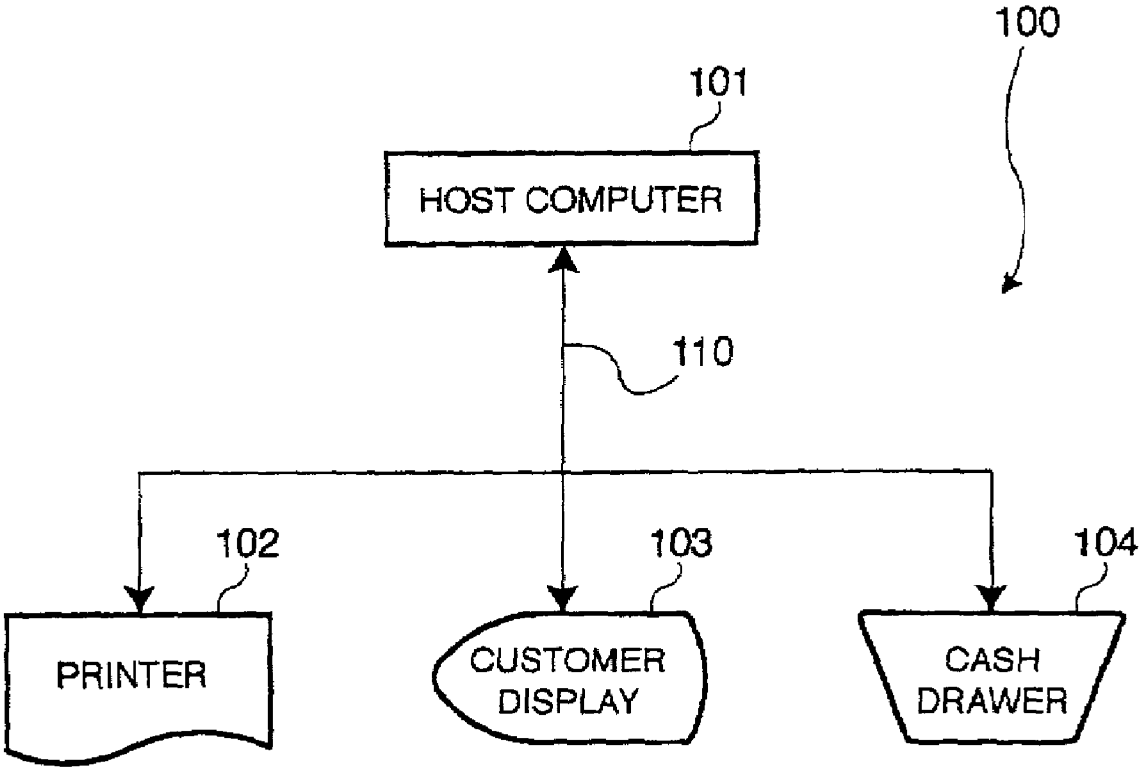
FIG. 1 shows a typical POS terminal system configuration.

FIG. 1 shows the configuration of a typical POS terminal system 100. This POS terminal system 100 has a host computer 101, printer 102 for printing receipts and a transaction journal, customer display 103 for displaying purchase information, and cash drawer 104 for holding money and checks. The host computer 101 stores a software application providing the various functions of the POS terminal system 100. The host computer 101 is connected by a communication bus 110 to a printer 102, the customer display 103, and the cash drawer 104. Various communication protocols can be used on the communication bus 110, including serial, parallel, and network (such as IEEE (Institute of Electrical and Electronic Engineers) 802), or USB (Universal Serial Bus). Although a POS terminal system is specifically described, the present invention may be broadly applied to other data processing systems that include peripheral devices connected to a host computer.

Figure 2:
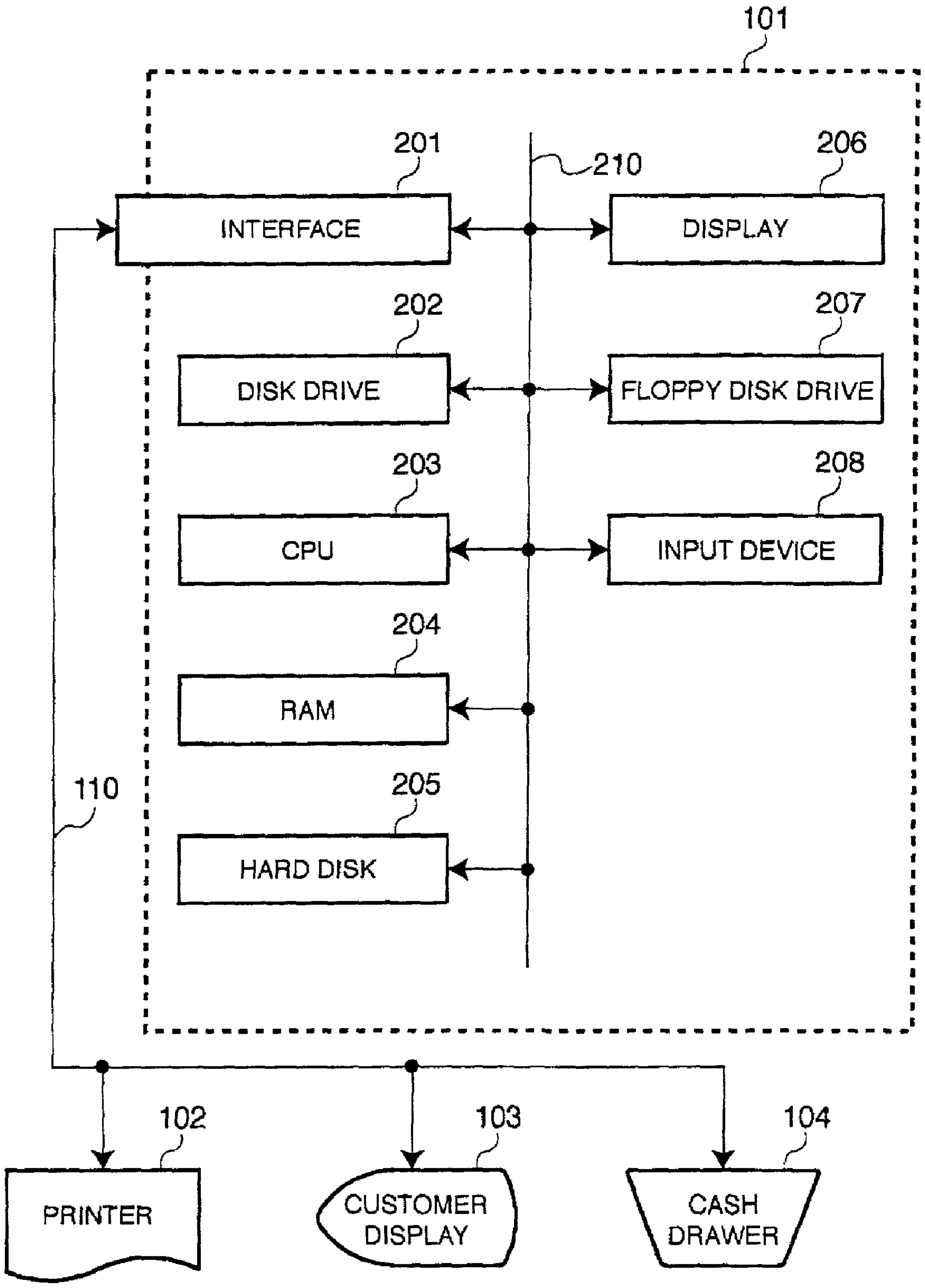
FIG. 2 is a block diagram of a POS terminal system.

FIG. 2 is a block diagram of the host computer 101. The host computer 101 has an interface 201 for connecting to the communication bus 110, a disk drive 202 for reading software and information from a CD (Compact Disc), DVD (Digital Video/Versatile Disc) or other medium, a CPU 203, RAM 204 for storing the program run by the CPU 203 and used as working memory by the CPU 203, a hard disk 205 for storing the program and data used by the CPU 203, a monitor or other type of display device 206 for presenting messages and information for the user, a floppy disk drive 207 for reading software and other information from a floppy disk, a keyboard and mouse or other type of input device 208 enabling user input to the system, and a bus 210 connecting these various components.

Figure 3:
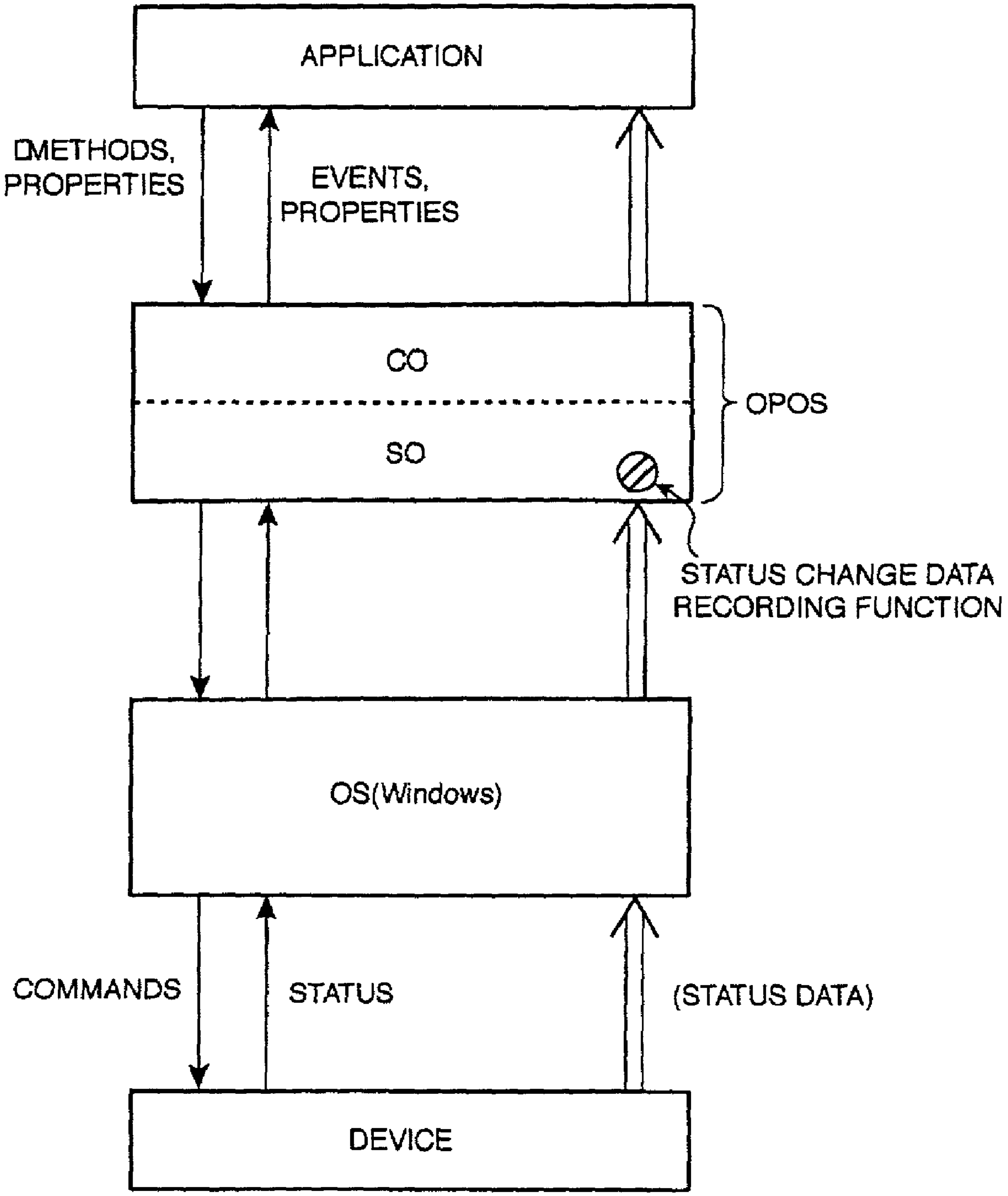
FIG. 3 shows the relative position and function of OPOS in a POS terminal system.

FIG. 3 illustrates the role of OPOS in a POS terminal system. As shown in FIG. 3, OPOS is located between the OS and the application controlling the devices in the POS terminal system, and provides a standardized interface for connecting the host computer and peripheral devices based on defined specifications.

OPOS has two layers, the control object (CO) layer and service object (SO) layer. Control objects are provided for each device class, such as printers and displays, and control the device-application interface. Service objects are provided for each device, such as for each printer model. The service objects control device operation by way of the OS.

The application controls a particular device using methods and properties, and receives feedback about the result of device control from the controlled device using events and properties. OPOS converts process requests from the application to commands supported by the device and sends the commands to the addressed device, and receives the status indicating the process result from the device. It also receives status data (report) including information about the state(s) of the device. The service object receives all device status data. As indicated in FIG. 3, the status change data recording function is a part of the service object. Status change data is extracted by searching the status data received by the service object for a device status that changed since the previous status data was received. The status change data required by the application is selected and converted (edited) to a specific transmission format, and then passed to the control object. The control object uses events to notify the application of a status change when status change data is received from a service object.

Figure 4:
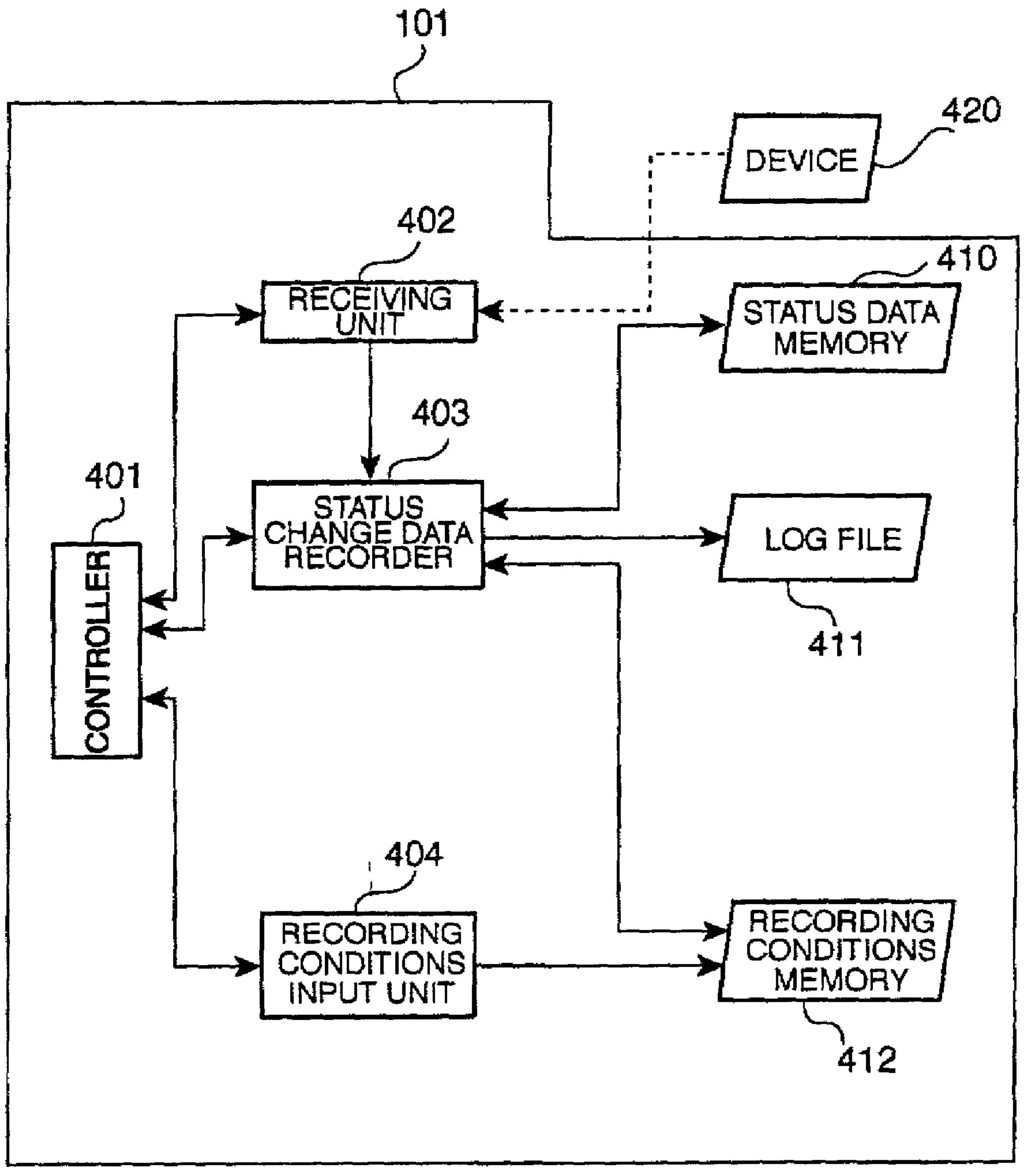
FIG. 4 is a function block diagram of a device status monitoring system.

FIG. 4 is a function block diagram of a device status monitoring system. As shown in FIG. 4, the host computer 101 comprises a controller 401, receiving unit 402, status change data recorder 403, and recording conditions input unit 404. The receiving unit 402 receives all status data sent from the device 420. The status change data recorder 403 compares the status data received by the receiving unit 402 with the previously received status data stored in status data memory 410. The status change data recorder 403 edits the status change data based on the status data that changed and the recording conditions stored in the recording conditions memory 412 to continuously update the log file 411. More specifically, a data log is generated and stored to a specific log file 411 (see FIG. 8) by converting status change data meeting the recording conditions to a text message, getting the time and date that the status data was received from a realtime clock IC of the host computer 101 by way of the OS, and writing the text message and time information as an entry in the log file. The received status data is also stored to the status data memory 410.

The recording conditions input unit 404 stores the recording conditions inputted from a keyboard, mouse, or other input device of the host computer (not shown in the figure) to the recording conditions memory 412.

The controller 401 cooperatively controls the receiving unit 402, status change data recorder 403, and recording conditions input unit 404. Part of controller 401 functionality, receiving unit 402, status change data recorder 403, and status data memory 410 are contained in a service object. In other words, the service object provides a status change data recording function for recording all status data received from a device.

Figure 5:
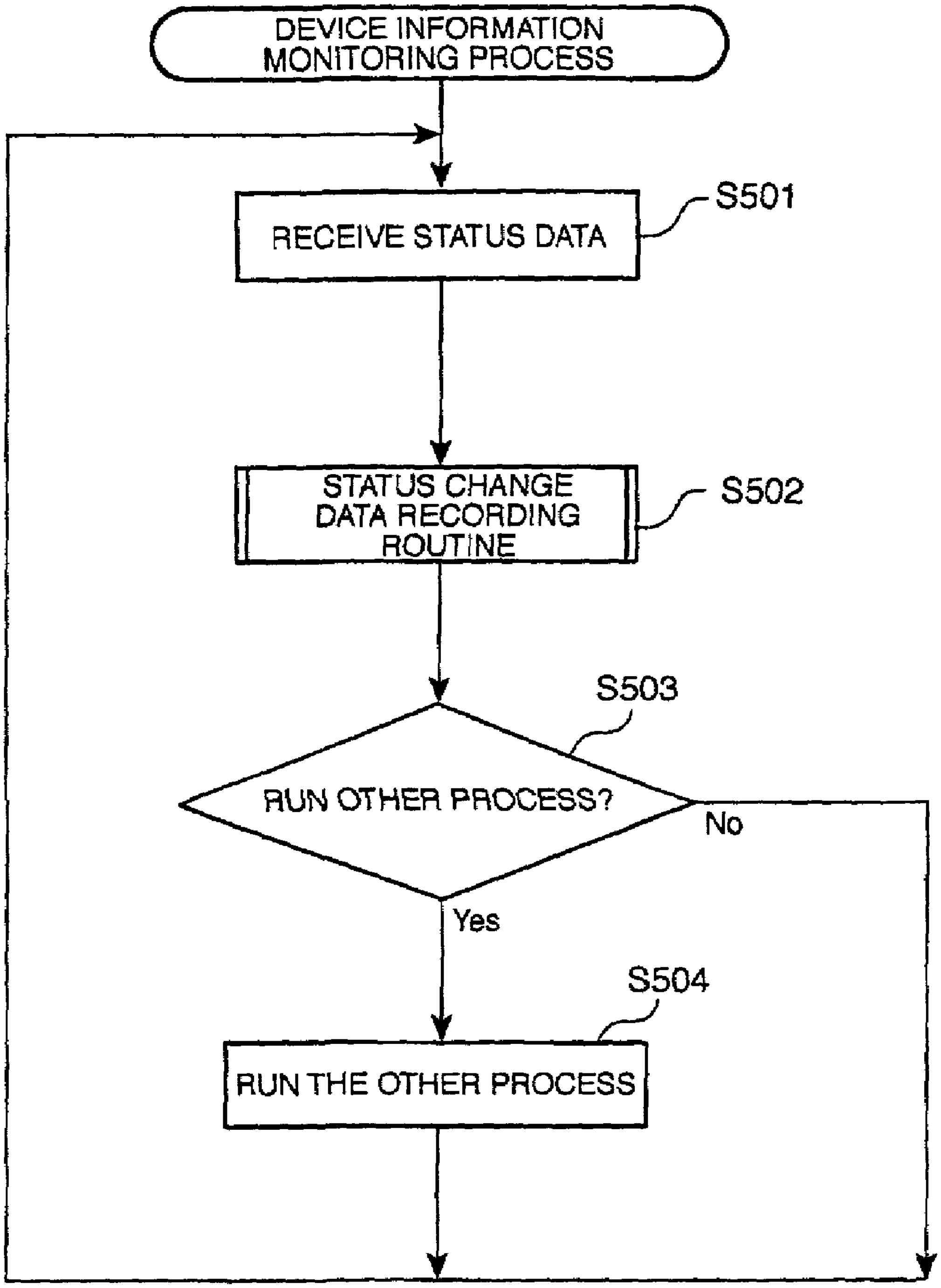
FIG. 5 is a flow chart of the device status monitoring process.

FIG. 5 is a flow chart of the device status monitoring process. This process starts with the receiving unit 402 receiving status data from a device (S501). The status change data recorder 403 then performs a status change data recording routine (S502) which includes comparing the received status data with the previously received status data, editing the status change data based on the recording conditions stored in the recording conditions memory 412 and the status data for which a change was detected in step S501, recording the edited log entry in the log file 411, and then storing the received status data in the status data memory 410.

Whether there is another process to run is then determined based on the status change data (S503). If there is (S503 returns yes), that process is run (S504), and the procedure then loops back to step S501 and waits until status data is received for another device. If there is no other process to run (S503 returns no), the procedure loops back to step S501 and waits until status data is received for another device. These other processes include, for example, reporting status change data to the application through a control object if the status change data is information that must be reported to the application.

Figure 6:
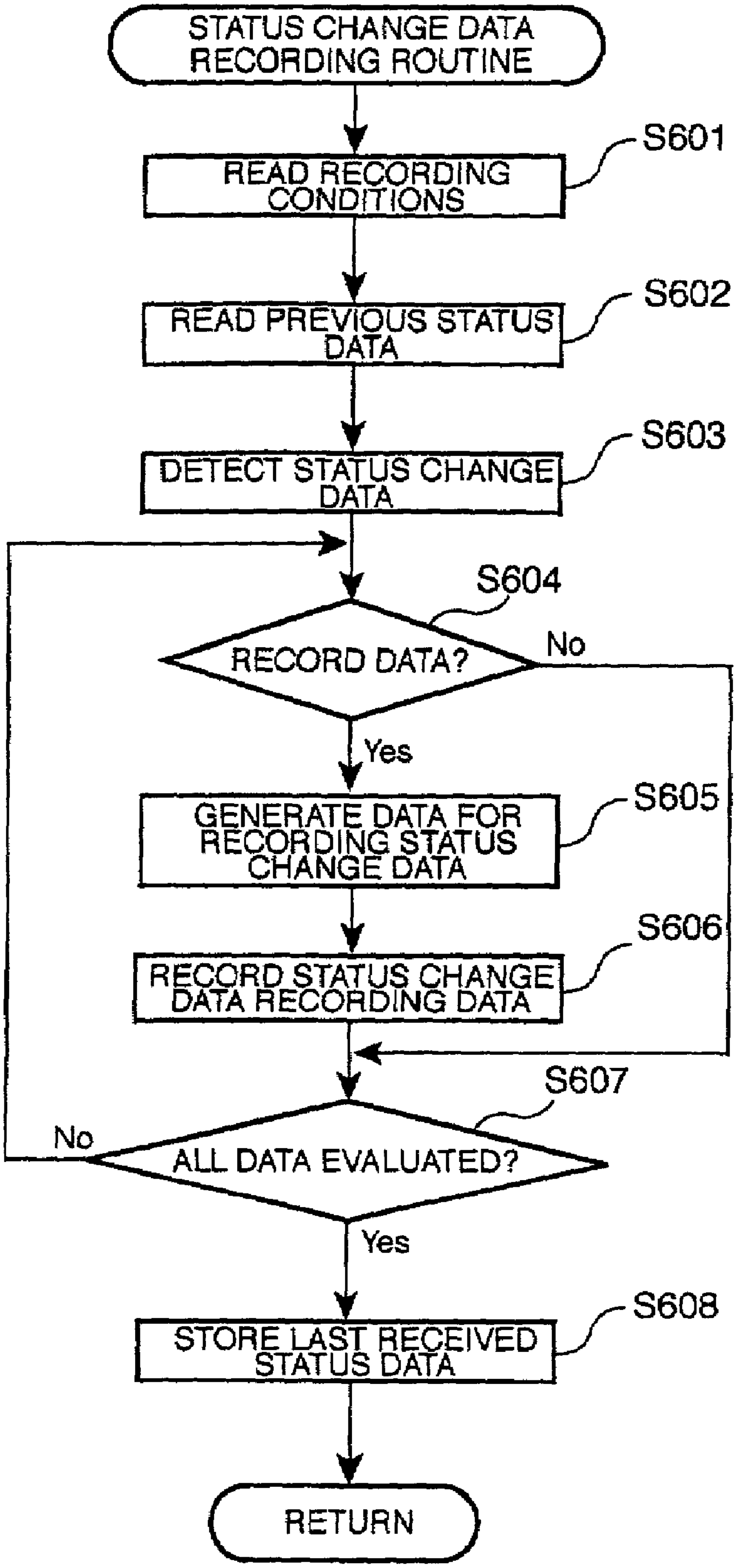
FIG. 6 is a flow chart of the status change data recording routine in the device status monitoring process.

FIG. 6 is a flow chart of the status change data recording process shown as subroutine S502 of the device status monitoring process shown in FIG. 5. The status change data recorder 403 first reads the required recording conditions from recording conditions memory 412 (S601). The required recording conditions indicate the device for which the status change data is to be recorded, the type of information to record, the filename to which the log is recorded, and the maximum size of the log file. The information types include error status and off-line status data, either or both of which can be selected as information to log. If neither is selected, the status change data recording function is inactive. Error status data includes information about errors that occurred and error recovery, such as that a mechanical error occurred and was corrected, or that an automatic paper cutter error occurred and was corrected. Off-line status data includes data indicating that the device went off-line and was then restored to an on-line status. This status data is generated, for example, when the printer goes off-line because the cover was opened, and when the printer comes back on-line because the cover was closed, or when the printer goes off-line because there is no paper and then returns on-line because paper was loaded.

The previously received status data is then read from the status data memory 410 (S602) and compared with the status data just received to detect any change in one or more status data (S603). Data indicating that a particular device status has changed is referred to herein as status change data. If a status data from a device is 1 byte long and each bit indicates a different device status, plural changes in device status could be detected from a single status data.

Whether the detected status change data should be recorded is then determined based on the recording conditions read from the recording conditions memory 412 (S604). This step is also referred to as a status change data evaluating step. More specifically, this step detects whether an error or off-line state was reported. If the status change data should be recorded (S604 returns yes), the status change data log entry is generated based on the status change data and a defined recording format (S605) and recorded to the log file 411 (S606). Control then steps to S607. If the status change data is not data that requires recording (S604 returns no), control skips forward to step S607.

Figure 8:
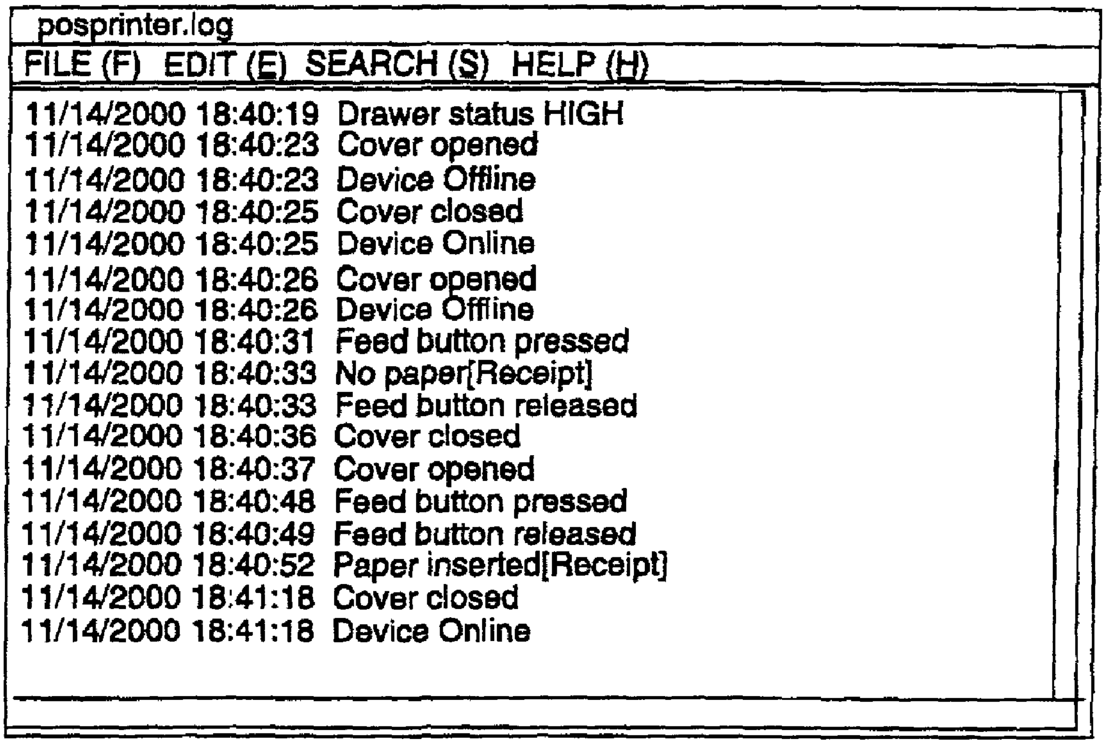
FIG. 8 shows an example of the status change data log written to the status change recording unit (log file)

More specifically, in step S605, the status change data log entry is generated by converting the status change data bits to a more easily understandable text expression, and the time and date when the status data was received is then added to the text expression to produce the log entry. The log entry is then stored to the specified log file (S606). It should be noted here that the log file 411 is a file stored to a hard disk or other data storage device of the host computer 101. The name, storage address, and maximum size of this log file are set in the recording conditions. When the log file recording the status change data reaches the maximum size specified in the recording conditions, the oldest log entry is deleted so that the newest entry can be added, or the oldest entry is overwritten by the newest log entry. An example of the status change recording log written to the log file 411 is shown in FIG. 8. In this example, the status change log is recorded in ascending order according to the date and time of the change in status.

Step S607 then determines if the status change data evaluation process (step S604) has been applied to all status change data. If it has (S607 returns yes), control moves to step S608. If the recording evaluation step has not been applied to all status change data (S607 returns no), steps S604 to S606 repeat until all status change data has been evaluated. After all status change data has been evaluated, the received status data is stored to the status data memory 410 (S608), and the status change data recording process ends.

The assignee of the present application has also developed a software utility (described in Japanese Patent Application JP 2001-1858 and in commonly assigned, co-pending U.S. application Ser. No. (not assigned), entitled "Device environment configuration system, device environment configuration method, and data storage medium therefor") which, by displaying a device tree organized by device class or connection port based on the OPOS device environment configuration stored in the registry, enables the POS system developer to visually understand how the devices in a POS terminal system are connected so that the device information can be easily edited and stored to the registry. FIG. 10A shows an example of a device map organized by device class showing how the various peripheral devices are connected, and FIG. 10B shows a display organized by device connection port.

Figure 7:
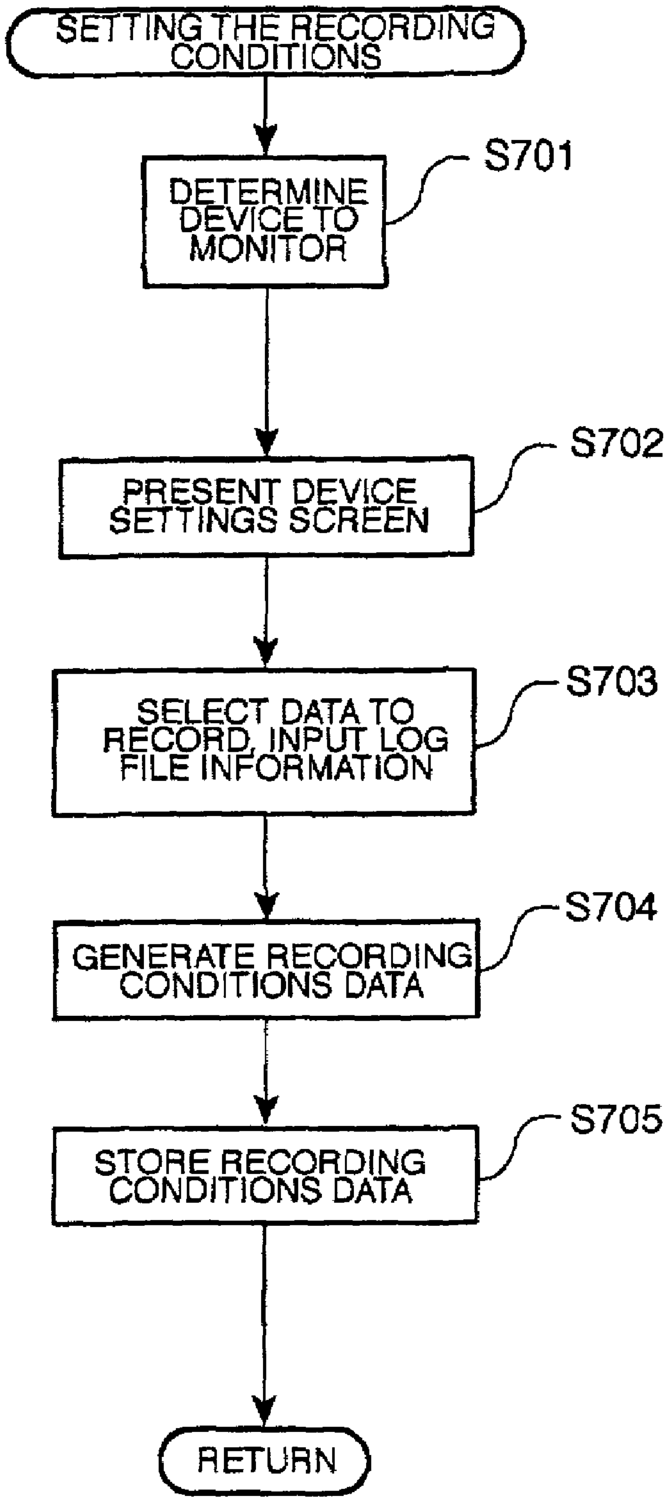
FIG. 7 is a flow chart of the process for setting the recording conditions.
Figure 9:
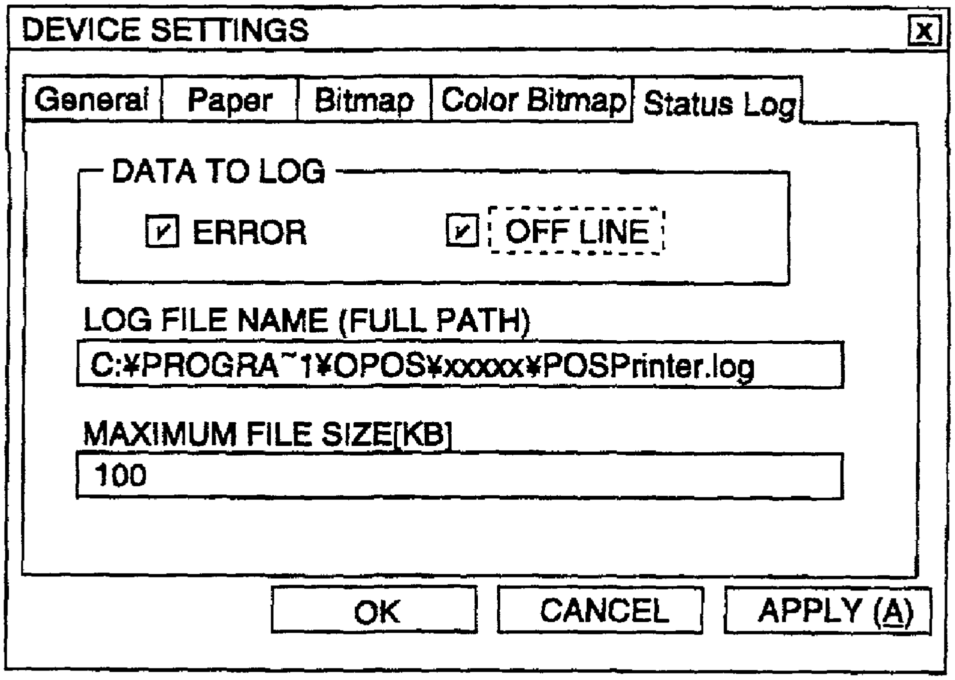
FIG. 9 shows an example of a screen for setting the recording conditions for a specific device.

The process for setting the recording conditions used in the status change data recording process is described next with reference to the flow chart in FIG. 7. If the device settings screen is selected by a particular operation when the device for which status change data is to be recorded is selected from the device map shown in FIG. 10A or 10B (step S701), a device settings screen for setting the recording conditions for a particular device is presented (step S702). An example of a device settings screen is shown in FIG. 9. Such a device settings screen enables the user to select the data to record (the data to be logged), the name of the log file to which the data is written, and the maximum size of the log file (step S703). The recording conditions written to recording conditions memory 412 are then generated based on the device, information, log file name, and maximum file size specified in step S703 (step S704). The recording conditions are then stored to the recording conditions memory 412 (step S705) and the process for setting the recording conditions ends. The recording conditions are stored, for example, in the OPOS device environment configuration settings written to the registry.

Figure 10B:
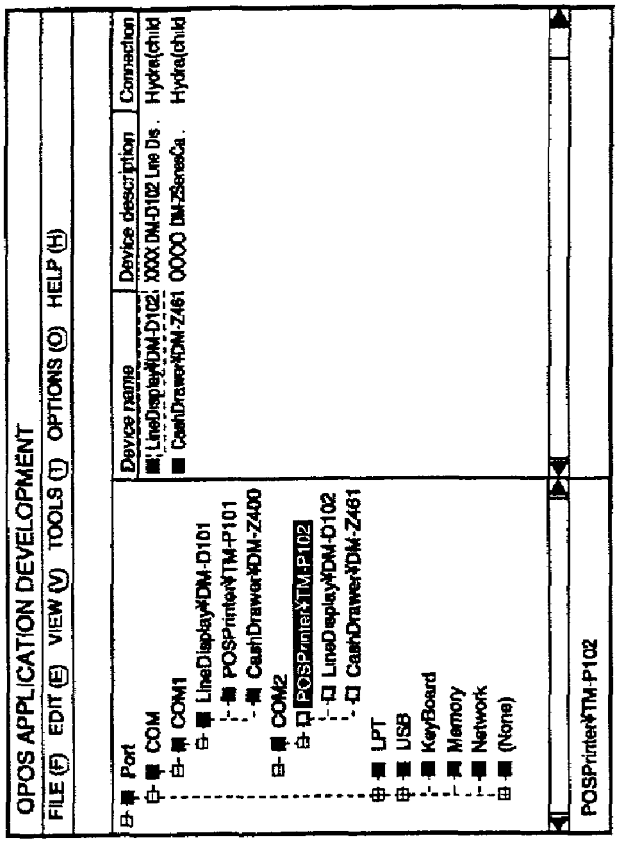
FIG. 10B shows the device information grouped by connection port.
Figure 10A:
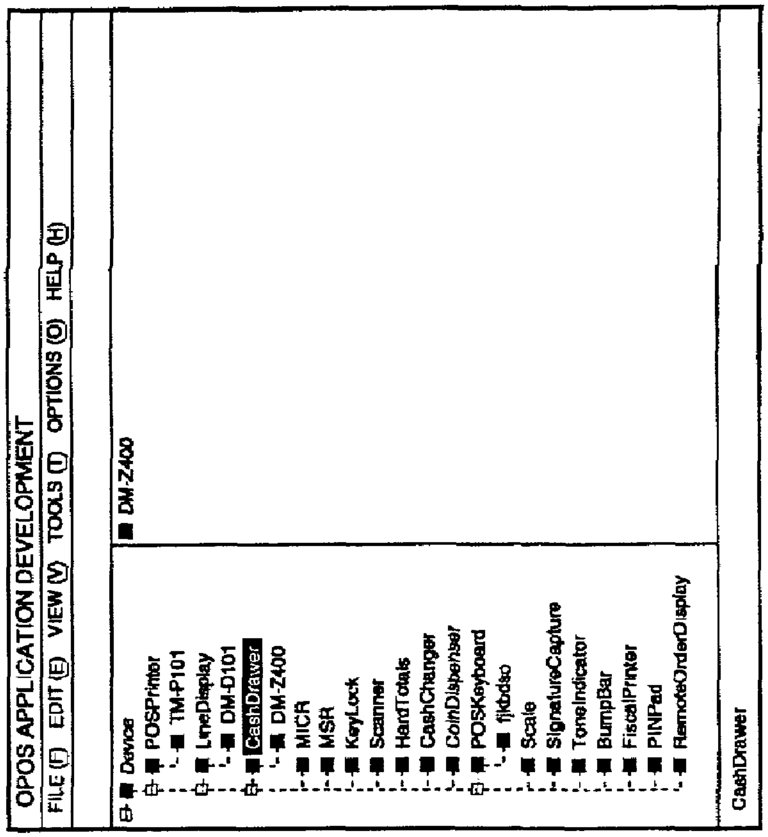
FIG. 10A shows the device information in the OPOS device environment configuration settings grouped by device class for display.

It should be noted that the process for setting the recording conditions using screens such as shown in FIG. 9 and FIGS. 10A and 10B is described here by way of example only. Alternatively, for example, a software utility specifically for setting the recording conditions could be used, or the recording conditions could be added to the registry using a registry editor provided by the operating system (such as the regedit.exe registry editor utility provided by the Windows operating system).

If the programmable functions of the device status monitoring system described above are correlated to the steps of the flow charts shown in FIG. 5 and FIG. 6, the status data receiving step corresponds primarily to step S501 and the status change data recording step to S502. The status change data editing step corresponds primarily to S604 and S605. The status change data detecting step corresponds primarily to S603; the status change data evaluating step to S604; and the status change data converting step to S605.

A practical device status monitoring method with broad general utility can also be achieved by implementing the programmable functions of the above device status monitoring system in a programmed computer. Those skilled in the art will be able to develop program code to implement the method based on the present disclosure without undue experimentation. The program code may be implemented in software or firmware.

As will be known from the preceding description of the invention, all changes in device status can be recorded by providing, in an OPOS service object for controlling a device connected to the host computer through the operating system of the host computer in a POS terminal system, a function for recording status change data, which is indicative of a change in device status, to a file or other recording unit. The application is thus able to use all information about changes in the status of a device.

By referencing the information written to the status change data log, the POS terminal system user or application developer, for example, can therefore know about problems with a device even when the status display of the device is hidden or the device does not have a status display.

Furthermore, the status change data recorded to the log file can be used for remote POS system maintenance by sending the data when an error occurs or at a regular interval from the host computer of the POS terminal system to a host server managing the POS system.

Yet further, the POS terminal system user can, for example, identify frequently occurring problems by reviewing the log, thus anticipate problems that are likely to occur again, and as a result be prepared to handle the problem.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A device status monitoring system in a data processing system, the data processing system including a peripheral device connected to a host computer, the host computer running an operating system and an application capable of controlling the peripheral device, the host computer including a device control system for controlling the peripheral device through the operating system, the device control system including a first object providing a device class interface to the application and a second object providing an interface for the peripheral device to the first object, the device status monitoring system comprising:

a status change data recording unit in the second object for continuously recording status change data indicating each sequential change in a device status to a status change recording unit; and a recording condition input unit for selecting the data to be record by defining one or more recording conditions.

2. The device status monitoring system of claim 1, wherein the status change data recording unit comprises:

a receiving unit for receiving status data indicating a device status from the peripheral device; and a status change data detection unit for detecting status data that changed as status change data based on the status data received by the receiving unit and previously received status data.

3. The device status monitoring system of claim 2, wherein the status change data recording unit comprises:

a recorded data editor for editing the status change data to status change recording data for recording to the status change recording unit.

4. The device status monitoring system of claim 3, wherein the recorded data editor comprises:

a recorded data evaluation unit for determining, based on the defined recording conditions, whether the status change data detected by the status change data detection unit is data to be recorded in the status change recording unit.

5. The device status monitoring system of claim 4, wherein the status change data includes error status and/or off-line status data; and the recording conditions include information indicating whether the error status and/or off-line status data is to be recorded.

6. The device status monitoring system of claim 3, wherein the recorded data editor comprises:

a recorded data generating unit for converting the status change data detected by the status change data detection unit to a text message and adding time information to the text message to generate the status change recording data.

7. The device status monitoring system of claim 1, wherein the device control system is OLE for Retail POS (OPOS), the first object is a control object, and the second object is a service object.

8. A device status monitoring method for a data processing system, the data processing system including a peripheral device connected to a host computer, the host computer running an operating system and an application capable of controlling the peripheral device, the host computer including a device control system for controlling the peripheral device through the operating system, the device control system including a first object providing a device class interface to the application and a second object providing an interface for the peripheral device to the first object, the device status monitoring method comprising:

selecting the data to be recorded by defining one or more recording conditions; and continuously recording, by the second object, status change data indicating each sequential change in a device status to a status change recording unit.

9. The device status monitoring method of claim 8, wherein the status change data recording step comprises:

receiving status data indicating a device status from the peripheral device; and detecting status data that changed as status change data based on the status data received by the receiving step and previously received status data.

10. The device status monitoring method of claim 9, wherein the status change data recording step comprises:

editing the status change data to status change recording data for recording to the status change recording unit.

11. The device status monitoring method of claim 10, wherein the status change data editing step comprises:

evaluating the status change data detected by the status change data detecting step to determine, based on the defined recording conditions, whether the status change data is data to be recorded in the status change recording unit.

12. The device status monitoring method of claim 11, wherein the status change data includes error status and/or off-line status data; and the recording conditions include information indicating whether the error status and/or off-line status data is to be recorded.

13. The device status monitoring method of claim 10, wherein the status change data editing step comprises:

converting the status change data detected by the status change data detecting step to a text message and adding time information to the text message to generate the status change recording data.

14. The device status monitoring method of claim 8, wherein the device control system is OLE for Retail POS (OPOS), the first object is a control object, and the second object is a service object.

15. A computer-usable medium carrying computer program instructions capable of implementing the method as described in any of claims 8 to 14.

16. An object program in a control system program stored on a storage computrr-readable medium, the control system program having a first object providing an interface for a device class to an application program, and a second object providing an interface for a device to the first object, the second object including the object program, the object program comprising commands for executing a process for:

receiving one or more defined recording conditions that are defined so as to select data to be recorded;

receiving status data indicating a device status from the device;

detecting, as status change data, status data that changed by comparing the received status data with previously received status data;

determining, based on the defined recording conditions, whether the status change data is data to be recorded in a data recording unit;

generating status change recording data by converting the status change data to a text message and adding time information to the text message; and continuously storing each sequential change in the status change recording data to a log file specified by the recording conditions.

17. The object program of claim 16, wherein the status change data includes error status and/or off-line status data.

18. The object program of claim 16, wherein the application program is a POS application program, the control system is OLE for Retail POS (OPOS), the first object is a control object, and the second object is a service object.

* * * * *